INVENTORS
ALVIN M. MARKS
MORTIMER M. MARKS

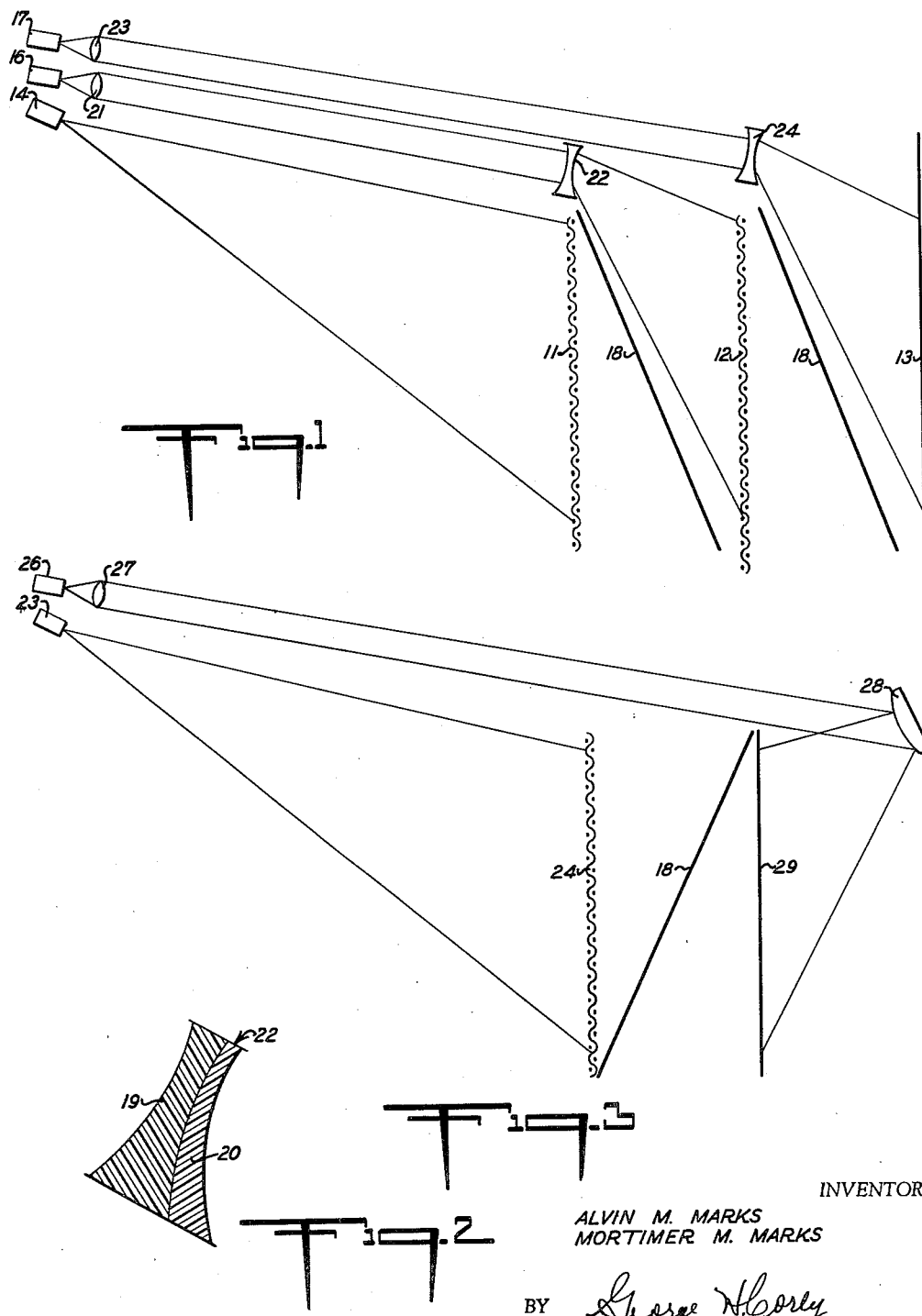

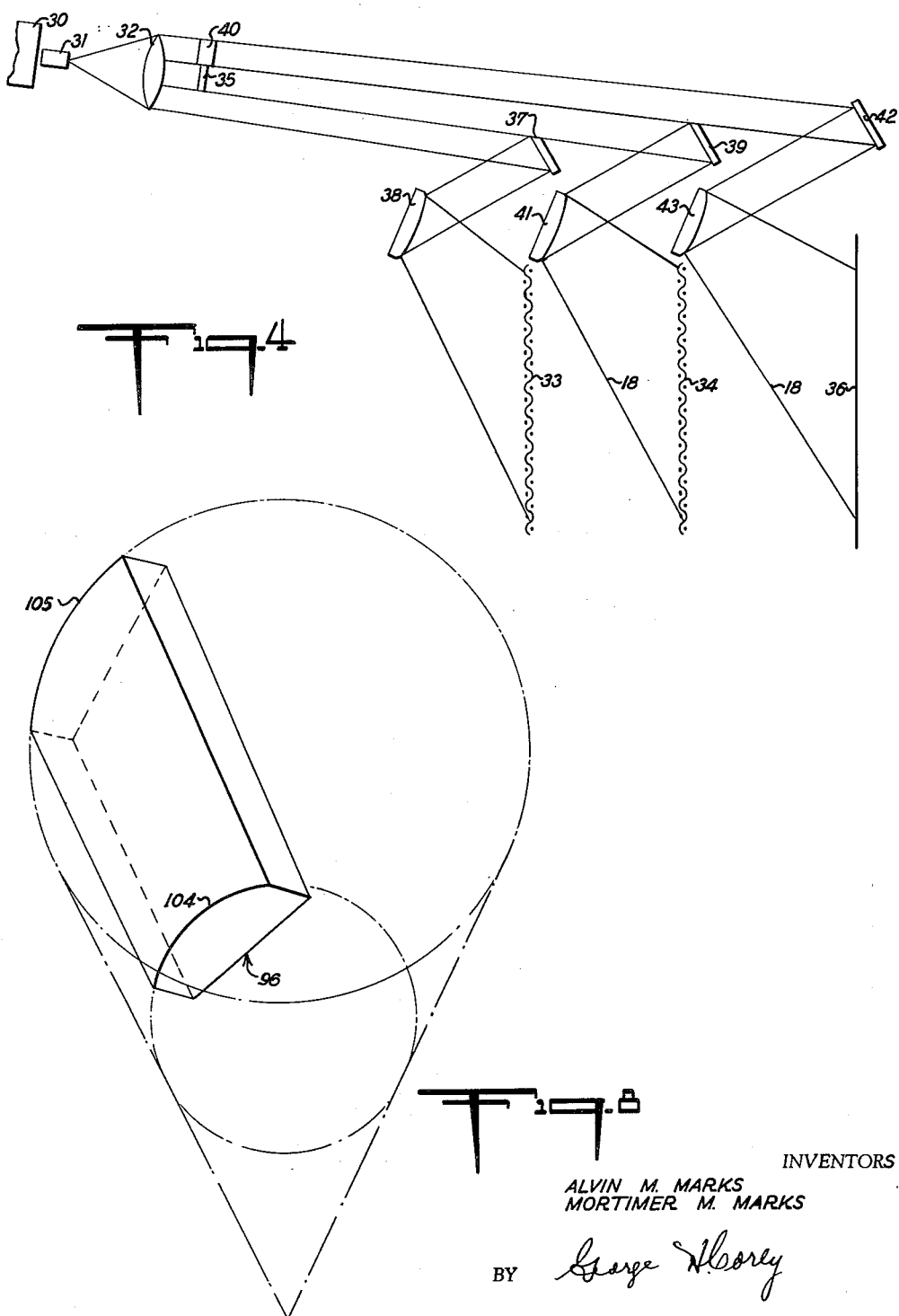

BY George H. Corey

ATTORNEY

Oct. 31, 1961    A. M. MARKS ET AL    3,006,241
METHOD AND APPARATUS FOR OVERHEAD PROJECTION
Filed Feb. 1, 1957    4 Sheets-Sheet 4
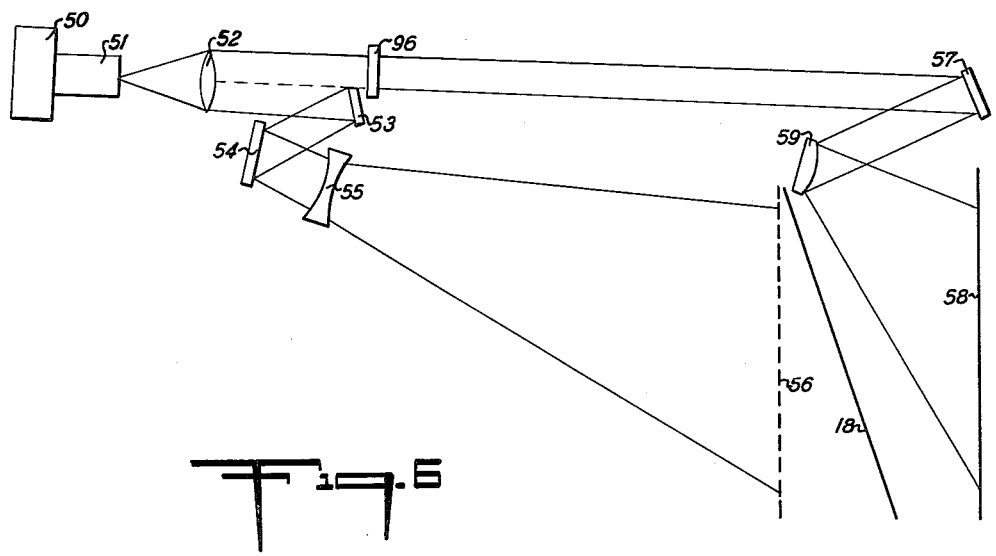
Fig. 6
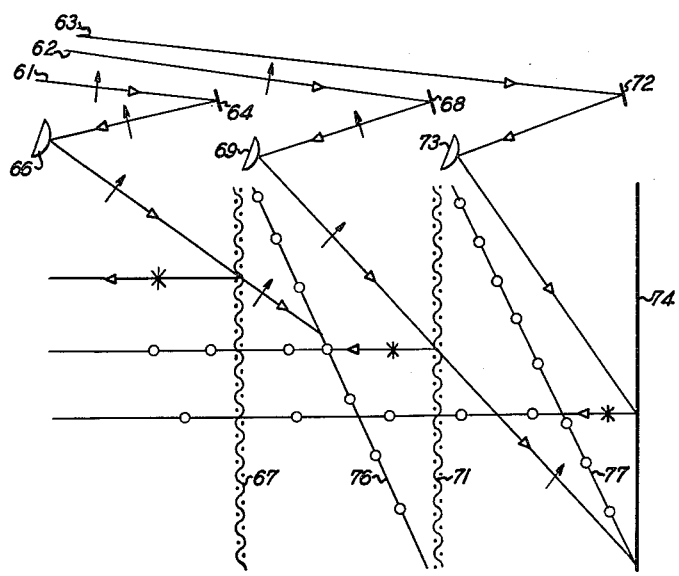
Fig. 9
INVENTORS
ALVIN M. MARKS
MORTIMER M. MARKS
BY 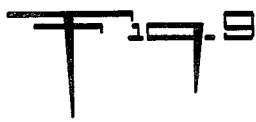
ATTORNEY

United States Patent Office 3,006,241
Patented Oct. 31, 1961

3,006,241
METHOD AND APPARATUS FOR OVERHEAD PROJECTION
Alvin M. Marks, 149—61 Powells Cove Blvd., Whitestone, N.Y., and Mortimer M. Marks, 166—25 Crydus Lane, Beechhurst, N.Y.
Filed Feb. 1, 1957, Ser. No. 637,798
17 Claims. (Cl. 88—16.6)

This invention relates to new and useful improvements in projecting images from a projector to a viewing screen wherein an obstacle to the projection is positioned along the axis between the projector and screen. The invention is particularly concerned with projecting a plurality of related images from a projector to spaced viewing screens which reconstruct the related images in space to there recreate a unitary scene. The invention also deals with an improved method of overhead projection from the rear of the audience to a screen or screens positioned behind a front screen in a system of spaced screens projection as disclosed in copending application, Serial No. 450,726, filed August 18, 1954 now Patent No. 2,952,182. In addition, the invention pertains to preferential transmission through and simultaneous blocking at the screens and filters of a multi-screen viewing system.

The aforementioned application discloses a system of a plurality of spaced screens in viewing alignment with an audience and a method of projecting related images onto each screen so that a viewer perceives a single integrated image having apparent depth characteristics. The related images generally represent foreground and background views of the same scene but positioning, color and relative light intensities of the images are so regulated that no apparent interference exists between the overlapping images as far as the viewer is concerned but an apparent unitary scene is created in space.

In FIGURES 2, 4, 7, 8 and 10 of the previous application, the image was projected by rear projection to the screen farthest removed from the audience, i.e., the screen was positioned between the audience and the projector. However, most theaters are not equipped for rear projection and cannot be converted to such without major construction and reduction of seating capacity, particularly where a second screen must be installed at a spaced distance closer to the audience.

FIGURES 10 and 11 in the previous application show projection to the screen farthest removed from the audience from either side of the screen by light polarizing techniques which enables two images to be projected along the same axis without interference on the screens. However, as described therein this reduced the light efficiency of the system and also required special polarized reflecting screens.

FIGURE 7 of the previous application shows projection from the rear of the audience to the screen farthest removed from the audience by directing the image from the projector to a flat mirror positioned on the ceiling which is so positioned and angled to reflect the image downwardly behind the front screen onto a second screen. This requires a mirror mounted on a relatively high ceiling to redirect the expanding image over the front screen to the second background screen. Few theaters have sufficient height and the mirror is awkwardly large to mount in the ceiling.

Thus although the projection methods shown in the previous application to the background screen may be practiced in certain theaters having suitable dimensions or equipment, these methods are not practical for the average theater now in existence without extensive alterations and the sacrifice of audience space.

The relative intensities of the viewed foreground and background images described in the previous application must be controlled to avoid image conflict. The control therein was achieved by light filters, varied transmission characteristics of the reflecting screens, and adjustment of light intensities at the projectors. However, there were great losses of light efficiency in all of those systems.

Therefore, it is an object of this invention to project an image from a projector to a point beyond an obstacle where the obstacle is in alignment between the projector and point without using a substantial projection area relative to the size of the ultimate image around the edge of the obstacle.

It is also an object of this invention to project a second image from the rear of a theater audience to a second screen behind and in viewing alignment with a screen nearer to the audience without impinging on the near screen from the audience side.

It is a further object of this invention to project a background image over the top of a foreground screen in a vertically compressed condition and then direct the image downwardly to a background screen in a normally expanded condition.

It is another object of this invention to compensate the vertical distortion and the horizontal distortion or keystoning that would arise from projecting onto the background screen at a relatively sharp angle and close thereto.

It is an additional object of this invention to project the background image through a compressing anamorphic optical device to vertically compress the image until passage over the foreground screen and then to direct the compressed image to an expanding anamorphic optical device to vertically expand the image to its normal and desired shape.

It is likewise an object of this invention for said expanding anamorphic optical device to direct the background image to the background screen or to reflectors that will do so.

It is a further object of this invention to employ interscreen filters adapted to obtain preferential transmission and blocking action of polarized light simultaneously with less attenuation of the desired multi-screen images viewed by the audience and thus increase the over-all lighting efficiency of the system.

With these and other objects in view, the nature of which will be more apparent, the invention will be more fully understood by reference to the drawings, the accompanying detailed description and the appended claims.

We have found that the disadvantages of the previous system may be eliminated by projecting both the foreground and background images from the rear of the audience as is customarily done with single image systems. The foreground image will generally be projected as usual to the foreground screen. However, the background image will be projected through a vertically compressing anamorphic optical device such as a positive cylindrical lens having its axis horizontal, which will compress the image in its vertical plane so that its height, when passing over the foreground screen, will be much less than the height of the ultimate foreground image to be viewed, so that less space will be required above the foreground screen. A pair of mirrors, one of which is cylindrical concave having its axis horizontal, could be used as the compressing anamorphic optical device but a lens is more efficient and only involves a single member.

After passing above the foreground screen the image may then be directed to the background screen by a negative cylindrical prismatic lens having its axis horizontal or a cylindrical convex mirror having its axis horizontal which will thus expand the image vertically to its normal shape. Since the negative lens or convex mirror which finally directs the images to the background screen causes the rays to impinge on the screen at a considerable angle from the normal so that the rays at the bottom travel further than those at the top, there will normally be both vertical and lateral distortion (the latter called keystoning). The lateral distortion will cause the projected image on the screen to be wider at the bottom than at the top, i.e., trapezoidal in shape. The vertical distortion does not effect the outside dimensions of the image but does cause the light rays to spread more vertically at the bottom than at the top. This can be compensated by printing the film with a reverse distorted image thereon and by using a projection lens with considerable depth of focus. It is preferred, however, that the lateral distortion be compensated by using special conical lenses having a vertical axis and the vertical distortion be compensated by providing the convex mirrors or concave lens with greater curvature (i.e., less radius of curvature) at the top than the bottom. In any event, the compensation should be such that all light rays will have spread to the same extent on impinging on the screen.

We have also found that the lighting efficiency of the previous system may be greatly improved surprisingly so by providing filters of linear or multilayer polarizers between the viewing screens. The linear polarizers used need not have complete extinction characteristics, and hence may have high transmission of the order of 40–50% with transmission ratios (maximum transmission divided by minimum transmission) of 100/1 to as little as 5/1. The multilayer polarizers may be of the low index (1.50 relative to air) with 5–15 layers, of high optical quality, thin, isotropic, plastic foil, or may comprise one or preferably two, and up to four layers of $TiO_2$ deposited on plastic foil or glass.

At the projector, conventional polarizers may be used, but with a loss of about 60% of the light. Preferably a reflux type polarizer may be used of the type described in the copending applications Serial No. 320,440, filed November 14, 1952, now Patent No. 2,887,566 and Serial No. 472,739, filed December 2, 1954, now Patent No. 2,810,324 with as little as 20% light loss. These losses at the projection polarizer will be compensated by advantages gained through the use of preferential transmission, and the blocking action made possible through the use of projected polarized light reacting with interscreen filters comprising linear or multilayer polarizers, as hereinafter described.

In the drawings:

FIG. 1 is a diagrammatic view taken on a longitudinal vertical plane through the center of a projection and plural screen system constructed in accordance with this invention and using negative prismatic lenses atop screens in front of the rear screen;

FIG. 2 is an enlarged diagrammatic vertical transverse section through one of the negative prismatic lenses of FIG. 1;

FIG. 3 is a diagrammatic view taken on a longitudinal vertical plane through the center of a modified system using a convex mirror above the screens that projects to the rear of the background screen;

FIG. 4 is a diagrammatic view taken on a longitudinal vertical plane through the center of another modified system that uses two mirrors above the screens to project to the front of the associated screens;

FIG. 6 is a diagrammatic view taken on a longitudinal vertical plane through the center of a further modification with the background and foreground image on a common frame but being split near the projector;

FIG. 8 is a perspective view of the conical lens 96 of FIG. 6;

FIG. 9 is a diagrammatic view taken on a longitudinal vertical plane through the center of a further modification showing special polarized interscreens;

Figure 10:
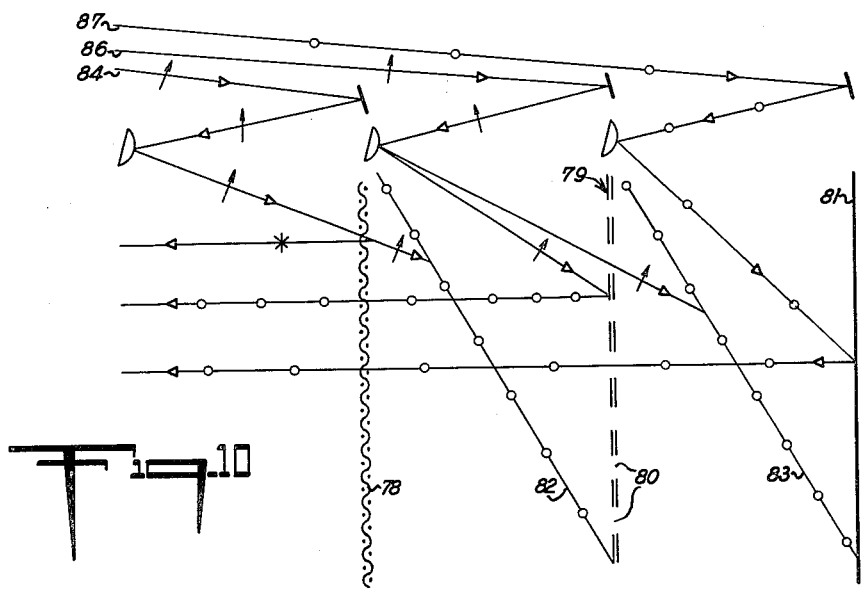
FIG. 10 is a diagrammatic view taken on a longitudinal vertical plane through the center of another polarized interscreen modification.

Referring to the drawings in detail, this invention as illustrated is embodied in a system for projecting a plurality of images from a point behind a viewing audience to a corresponding plurality of screens that are spaced from one another along the viewing axis and is primarily concerned with an improved method of projecting the associated images to the screens beyond the screen nearest to the audience.

FIG. 1 demonstrates a three-screen system in which the front screen 11 and intermediate screen 12 are wire mesh screens and the rear screen 13 may be the regular reflecting screen used in most theaters today which allow practically no light transmission therethrough. There is also shown a corresponding projector 14, 16 and 17 for each screen, all of which are synchronized. Transparent neutral density filters 18 are positioned intermediate the reflecting screens. The structure so far described in this paragraph has been shown in the aforementioned application and is not novel with the instant application. Furthermore, the intermediate screen 12 and the associated elements concerned therewith may be removed leaving a two-screen system of front screen 11 and rear screen 13 which is a simple practical modification of the multiscreen system.

The foreground projector 14 projects the foreground image to the foreground screen 11 in the conventional manner. However, the intermediate projector 16 projects the intermediate image to a cylindrical converging positive lens 21 having its axis horizontal so that the image is then transmitted in a compressed vertical dimension to reach a point immediately above the foreground screen 11 with a relative small vertical height, e.g., one-fifth to one-tenth of what it normally would have at that point. In other words, the beam of light passing from the lens 21 has approximately parallel (may be slightly convergent or preferably slightly divergent) light rays. Positioned immediately above the near foreground screen 11 is an elongated, cylindrical, diverging, negative, prismatic lens 22 having its axis horizontal which transmits the image downwardly and in an expanding form to the intermediate screen 12. Background projector 17 projects the background image to positive lens 23 where the image is similarly compressed and directed to the negative prismatic lens 24 and thence downwardly in expanded form to the background screen 13. Lenses 21 and 23 should be placed at approximately their focal length relative to the associated lenses of projectors 16 and 17. A slight convergence of a beam may be produced by placing the associated positive lens 21 or 23 at a distance from the associated projector lens slightly greater than the focal point or a slight divergence at a distance slightly less than the focal point. We prefer that the light rays be parallel or slightly diverging. Lenses 21 and 23 will generally be at least 12 inches in diameter so that the normal projector lens operates as a point light source for practical purposes. Since the intermediate and the background images travel greater distances from projector to viewing screen than the foreground image, it is necessary to provide different focus which may be done by providing spherical curvature on the lenses 21 and 23, separate spherical lenses, or the focusing may be done with the projection lenses of the associated projectors 16 and 17.

The enlarged view of FIG. 2 shows the detailed structure that the negative prismatic lenses 22 or 24 will generally have. Since chromatic aberrations may occur with simple thick lenses, it is desirable to construct an achromatic pair comprising two lenses of compensating dispersions in known manner. Thus we have shown the negative prismatic lenses as including a front element 19 and a rear element 20 although a single element lens is considered to be within the scope of this invention. The size of these lenses will favor the use of transparent plastics as the material from which they are made rather than glass. The concave curvature of rear element 20 is shown with greater curvature toward the top than the bottom to compensate for vertical linear distortion. This feature can be incorporated in either or both of the front and rear concave surfaces.

In FIG. 3 we have a somewhat similar modification in which a foreground projector 23 projects a foreground image to foreground screen 24 in the conventional manner and the background projector 26 projects an image to positive lens 27 as was done in FIG. 1. However, in this instance the image is then directed from the positive lens to a cylindrical convex mirror 28 having a horizontal axis from whence it is reflected forwardly in an expanded condition to the background screen 29, this screen being a rear projection screen known to the art. In this instance the convex curvature of mirror 28 has a greater curvature toward the top to compensate for vertical linear distortion.

In FIG. 4 there is demonstrated still another modification wherein only a single projector is used with the three associated images being positioned on a single frame of the film. The projection lens 31 of the projector 30 projects the image to a positive cylindrical lens 32 which transmits the vertically compressed image in alignment along an axis above all three of the corresponding screens 33, 34 and 36. The image 47 positioned on one-third of the frame shown in FIGURE 5 impinges on foreground mirror 37 and is reflected back toward the audience to a cylindrically convex foreground mirror 38 having a horizontal axis which in turn vertically expands the image and reflects it downwardly and away from the audience to the foreground screen 33. Similarly, the image 48 on the intermediate portion of the frame impinges on intermediate mirror 39, is reflected to intermediate cylindrically convex mirror 41 which in turn vertically expands and reflects the image to intermediate screen 34. Likewise the background image 49 impinges on flat background mirror 42 and is reflected to the background cylindrically convex mirror 43 and in turn is vertically expanded and reflected to the background screen 36. Since the three images must each travel a different distance between the projector and associated viewing screen, provision must be made for different focusing. Thus lenses 35 and 40, which are cylindrical with vertical axes and slightly convex are shown near positive lens 32 for focusing the images destined for screens 34 and 36, respectively. The lens 40, which is associated with background image 49 that travels the greatest distance, is more convex than the lens 35. The image for screen 33 will be focused at the projector. The differential focusing of the three images can be done by various other ways that are known to the art.

Figure 5:
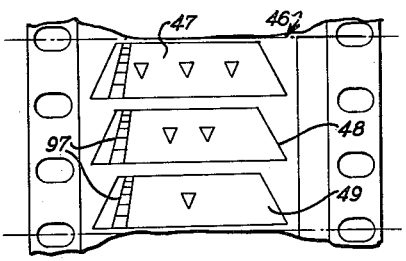
FIG. 5 is a diagrammatic plan view of a film frame that may be used with the system of FIG. 4.

FIG. 5 shows a film frame 46 adapted for use in the projector 30 of FIG. 4 with the foreground image 47 at the top of the frame, the intermediate image 48 in the middle and the background image 49 at the bottom, each image being positioned on its respective horizontal one-third of the film frame. The foreground image 47 is projected at the bottom but positioned on top of the frame because the projector 30 reverses the images.

Due to the fact that the last optical device to transmit the various images to the background or intermediate screens, and even to the front screen in FIG. 4, is positioned much closer to the top of the screen than to the bottom thereof the light rays will be spread more at the bottom than at the top of the screen, causing both lateral and vertical linear distortion as explained before.

This distortion can be compensated for, however, by reverse distortion of the images when they are being printed. An example of this is shown in FIG. 5 where the associated images 47, 48 and 49 are shown to be narrower at the top than at the bottom and the spaced markings on the rulers 97 closer together at the top than at the bottom although when viewed on the screen the markings will all appear to be equally spaced. The projector lenses should have considerable depth of focus so that no part of the projected field is noticeably out of focus. The distortion may also be compensated for by special lenses per se or lenses and mirrors suitably combined in the system as described elsewhere herein.

Figure 7:
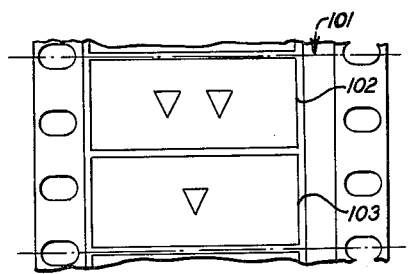
FIG. 7 is a diagrammatic plan view of a film frame that may be used with the system of FIG. 6.

In FIG. 6 is shown a single projector 50 with a lens 51 which projects the image of the film frame to the positive cylindrical lens 52, the film frame 101 being split into two images, both of which are rectangular, as shown in FIG. 7. The foreground image 102 from the upper half of the frame which emerges from the positive lens 52 impinges on a first flat mirror 53 and is reflected back and downward for a short distance to a second flat mirror 54 from which the image is projected to and vertically expanded by the negative cylindrical lens 55 having its axis horizontal. From this lens the image is directed to the foreground screen 56.

The foreground screen 56 is shown as a perforated vinyl plastic fabric screen that is known to the industry for allowing sound to be transmitted through the viewing screen. A screen readily available is formed of a cloth impregnated with vinyl resins and treated on one surface with a white pigment and reflective particles to give a diffused reflectivity. There are 74 perforations per square inch which are 0.078" in diameter to allow about 35.4% transmission of light through the screen. This, or similar perforated screens, may be used to substitute for any of the wire screens shown in the various embodiments herein.

At the present time, the wide screen with an aspect ratio of 2.50 or 2.35 to 1 is in favor in the industry. It so happens that horizontally splitting the standard frame of a 35 mm. film, which normally occupies 18.16 mm. x 23.16 mm., into two images, provides two images of about 9 x 23.16 (slight space between the images) resulting in two images each with a 2.55/1 ratio, without further anamorphizing. Picture grain can be minimized by taking the pictures with 65 or 70 mm. frames and reducing them down, as is well known in the art.

The negative lens 55 is used to expand the foreground image which was compressed by positive lens 52. The background image 103 which is on the lower half of the frame is vertically compressed by the positive lens 52 and directed through a correcting conical lens 96 to background mirror 57. From here it is reflected to the corrected cylindrical convex mirror 59 where it is vertically expanded and reflected to the background screen 58 where it impinges as an undistorted image.

The lens 96 as shown in detail in FIG. 8 has been specially developed to compensate for lateral distortion or keystoning of the ultimate image on the rear screen 58. The lens is a section from a cone having a vertical axis and is taken parallel to an edge of the cone to have a convex surface and a planar surface with the convex surface having a greater curvature 104 (i.e., less radius of curvature) at the bottom (as the lens is positioned) than the curvature 105 at the top. The lens 96 insures that the background image is rectangular when impinging on background screen 58. The lens can be used alone or in combination with other lenses in any of the embodiments herein disclosed to compensate for the lateral distortion. In fact, the spherical correction required because the background image travels further than the foreground image may be provided by the horizontal curvature of one surface of the lens 96 and the vertical curvature of positive lens 52 (assuming that the foreground image did not pass through lens 52). Lenses 52 and 96 could be combined into a single lens. In addition, a plano spherical lens may be laminated to the planar surface of lens 96. The vertical distortion is compensated at the cylindrically convex mirror 59 which has greater curvature at the top than at the bottom.

It will be appreciated that mirror 53 could be positioned in the light path prior to positive lens 52 since it is unnecessary to compress the foreground image. However, since the foreground image has been here shown as passing through the compressing lens 52, it must be vertically expanded as by negative lens 55. If mirror 54 were convex, it would expand the image and lens 55 could be eliminated. Thus the elimination of lens 55 is possible whether mirror 53 is inserted before or after the positive lens 52.

Figure 11:
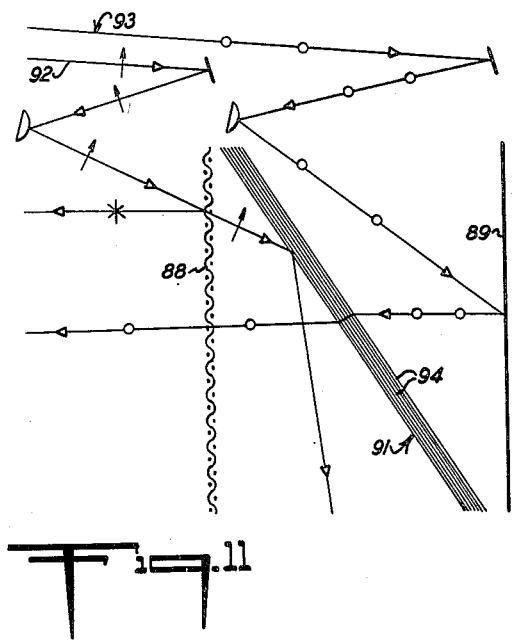
FIG. 11 is a diagrammatic view taken on a longitudinal vertical plane through the center of a further interscreen modification using a multi-layer polarizer.

FIGS. 9, 10 and 11 disclose embodiments utilizing polarized light and interscreen filters designed for preferential transmission and blocking of polarized light which may be combined with any of the modifications previously described herein. For the purposes of simplicity and clarity in the drawings, vertically directed arrows have been used to show polarization in the vertical plane, small circles to show polarization in the horizontal plane, and asterisks to show unpolarized light. Although the description herein refers to horizontal and vertical polarization, it is well known that this is the convenient way of describing orientation of polarization at angles 90° removed from one another.

FIG. 9 shows a system generally similar to FIG. 4 except for the polarization features. The front image 61 and intermediate image 62 have been polarized in the vertical plane by any well known means which need not be illustrated here. In this embodiment, the rear image may be polarized or unpolarized. If the reflux type polarizers referred to hereinbefore are used, it will be possible to transmit from 60 to 85% of initial white light as polarized light from the projector. The conventional linear polarizers will only transmit from 35 to 45% of white light unless the polarization ratios are reduced to achieve somewhat higher transmission than 45%.

When polarized light is reflected from an ordinary white surface, the polarization of the light is lost. Thus when image 61 strikes the front wire screen 67 which has been coated with a diffusing white coating, the reflected image has no polarity. However, the light that passes through the screen openings remains vertically polarized. There are conventional linear polarizing filters 76, 77 positioned between each adjacent pair of screens that allow only vertically polarized light (about 80%) to pass. About 40% of unpolarized light will be transmitted as vertically polarized light. Thus when the image 61 passes through the wire screen 67 to strike the front filter 76, the image is completely absorbed. If image 61 was 100 lumens at the projector and screen 67 is adapted to reflect 40% and transmit 50%, the image would be 85 lumens after leaving a reflux polarizer and have 34 lumens reflected from the front screen to the audience.

Image 62 strikes the intermediate wire screen 71 and is partially reflected as a non-polarized image. This image, in turn, passes through the front filter 76 and becomes horizontally polarized. This, in turn, passes through the front screen to the viewing audience. However, if a 85 lumen image came from the polarizer and 40% was reflected at screen 71 as unpolarized light, 34 lumens would impinge on the front filter 76 which would transmit 40% thereof or 13.6 lumens. 50% of this only passes through the front screen 67 so that the audience receives about 6.8 lumens. That portion of image 62 passing through the openings of screen 71 retains its vertical polarization and is completely absorbed by the rear filter 77.

The rear image 63 strikes rear screen 74 which is an ordinary white reflecting screen so that the image is reflected in non-polarized form whether polarized or not before reaching there. If an 85 lumen image is directed to screen 74 which has reflection factor of 85%, 72 lumens are reflected to strike the rear filter 77. 40% or 29 lumen is transmitted and horizontally polarized which is further reduced 50% at screen 71 to become 14.5 lumens. Since it is horizontally polarized, the 14.5 lumens passes relatively freely through the front filter 76 which has a transmission factor to horizontally polarized light of 80%, leaving 11.6 lumens which is again 50% reduced at the front screen 67 to thus strike the audience as 5.8 lumens. Thus we have a ratio between the three images of 34:6.8:5.8 or 100:20:17.1 on striking the audience. The intensity of these images may be differently balanced if desired by varying the transmission and reflection characteristics of the various screens and filters.

The embodiment of FIG. 10 is somewhat different. Front screen 78 is the same wire screen previously shown but intermediate screen 79 rotates the plane of polarization of the light reflected therefrom through 90°. It is known that reflected light will be rotated from vertical polarization to horizontal or vice versa if a transparent plastic film of suitable thickness and stretch at a 45° angle to the horizontal is secured with a transparent cement to the front of the screen. The film is known as a quarter wave retardation birefringent plastic. The retardation is a quarter wave length in each direction making a half wave total retardation during the process of reflection which results in the 90° rotation of the plane of polarization. The screen 79 is formed with perforations 80 which allow passage of light. The rear screen 81 is a metallized screen which reflects light in the same plane of polarization as the light impinging thereon. Positioned between front screen 78 and intermediate screen 79 and between intermediate screen 79 and rear screen 81 are horizontally polarized front and rear filters 82 and 83, respectively with 80% transmission factors for horizontally polarized light. The front and intermediate images 84 and 86 are vertically polarized and the rear image 87 is horizontally polarized. If the front image 84 is of 85 lumens brightness, 34 lumens will be reflected by screen 78 and 42.5 lumens pass through to be completely absorbed by the front filter 82. If the vertically polarized intermediate image 86 has 85 lumens brightness, 40 lumens will be reflected by screen 79 but in a horizontally polarized state. 80% or 32 lumens will be transmitted through the front filter 82 to be reduced 50% again at screen 78 to have a 16 lumen value on reaching the audience. The horizontally polarized rear image 87 of 85 lumens is reflected with an 85% reflection factor by screen 81 as 72 lumens still horizontally polarized, 80% or 57.6 lumens being transmitted through rear filter 83. This is reduced 50% to 28.8 lumens by intermediate screen 79. 80% or 23 lumens passes through the front filter 82 but is again 50% reduced to 11.5 lumens by front screen 78. Thus we have an image ratio of 34:16:11.5 (100:47:34) and a lighting efficiency of 20.5% based on total projected light at 100 lumens for each image before initial polarization.

FIG. 11 shows still a further modification that includes a front wire screen 88, a rear metallized screen 89 and a multi-layer polarizer 91 of a type known to the art. Such multi-layer polarizers may be made of 6 to 15 layers 94 of inexpensive, thin, transparent sheets of plastic in parallel layers. If vertically polarized light strikes such a unit at an angle 57° removed from normal, the light will be totally reflected, whereas horizontally polarized light will be completely refracted and transmitted. Although 57° has been shown to give maximum reflection of vertically polarized light, there is general reflection through an angular range of 20 to 70° that is workable for the purposes of this invention. Thus the vertically polarized front image 92 that passes through front screen 88 to impinge on the multi-layer polarizer 91 must be so angularly related to the polarizer that the reflections at the angle of incidence does not strike the audience. The angle of reflection toward the audience can be varied by changing the angle of projection of front image 92 and the angular position of the multi-layer polarizer 91.

If initially the projector directs a 100 lumens image through a reflux polarizer, 85 lumens are transmitted to front screen 88 which will reflect 34 lumens to the audience. The rear image 93 is 85 lumens after being horizontally polarized as with the front image. This is reflected as 72 lumens in the horizontally polarized state of the rear metallized screen having 85% reflectivity. The multi-layer polarizer 91 has an 80% transmission factor to horizontally polarized light and thus transmits 57.6 lumens. The image is then reduced 50% at the front screen 88 to 28.8 lumens so that the image ratio would be 34:28.8 (100:85) and the light efficiency of the system is approximately 31.4%.

The embodiments disclosed in the drawings have demonstrated two and three screens and it will be appreciated that either embodiment could utilize two or three screens, or in fact more screens.

A single or plurality of projectors has also been shown which is, of course, well known to the projection art. For clarity of illustration, the projectors are shown one above the other but can be as easily arranged on a horizontal line. Any of the single or plurality projector arrangements can be utilized with the various screen arrangements that are shown. If a plurality of projectors are used it is, of course, necessary to have them properly synchronized. If a single projector is used each film frame may contain the associated images like those shown in FIG. 5 and FIG. 7 or the associated images may be positioned on succeeding frames with proper equipment to reflect them to the associated position shown herein, this manner of projecting related images from succeeding frames being well known to the movie art and not considered a necessary part of the explanation of the instant invention.

Filters have been shown between the screens in all of the embodiments herein but as pointed out in the aforementioned application, the filters may be dispensed with if other means are provided to regulate the relative light intensities of the associated images.

No claims are here being made to the screens, as such, as they are generally conventional screens or those described in the aforementioned application. Most of the front and intermediate screens have been shown here as wire mesh screens which we have found to be very successful for these purposes. Any suitable perforated screen may be used, and particularly the perforated fabric-plastic screen of standard construction used presently for passage of sound and shown in FIG. 6. The relative area of perforations to reflecting area may be adjusted to vary the light transmission. The absolute size of the perforations must consider the definition of the image and the resolving power of the viewers' eyes.

Chromatic correction will be provided for the various lenses if necessary as known in the art. It will be readily appreciated by those in the art that the various individual features disclosed in the embodiments herein may be incorporated or substituted into the various other embodiments and it is intended to be so included within the scope of this invention.

We claim:

1. The method of projecting a three-dimensional display for a viewer comprising providing a first screen having reflecting areas with open spaces therebetween with such dimensions as to reflect and transmit apparent whole images to a viewer, providing a second screen, arranging the screens such that the second screen is spaced rearwardly of the first screen such that a viewer located in front of the first screen can see apparent whole images when projected on the first screen and the second screen, projecting a first image from a point in front of the first screen on the first screen, and simultaneously projecting a second image from a point in front of said first screen, flattening the projected beam of said second image to decrease its cross-sectional height, directing said flattened beam in a path which will clear the margin of said first screen, and expanding the flattened beam to its original cross-sectional shape while directing the expanded beam upon said second screen.

2. The method of projecting a three-dimensional display for a viewer comprising providing a first screen having reflecting areas with open spaces therebetween with such dimensions as to reflect and transmit apparent whole images to a viewer, providing a second screen, arranging the screens such that the second screen is spaced rearwardly of the first screen such that a viewer located in front of the first screen can see apparent whole images when projected on the first screen and the second screen, projecting a first image from a point in front of the first screen on the first screen, and simultaneously projecting a second image from a point in front of said first screen, flattening the projected beam of said second image to substantially parallel rays in at least one plane to decrease its cross-sectional height, directing said flattened beam in a path which will clear the margin of said first screen, and expanding the flattened beam to its original cross-sectional shape while directing the expanded beam upon said second screen.

3. A projection method as defined in claim 2, in which the projected beam of the second image is flattened in the vertical plane.

4. A method of projecting a three-dimensional display for a viewer comprising providing a rear screen and a plurality of forward screens having reflecting areas with open spaces therebetween of such dimensions as to reflect and transmit apparent whole images to a viewer, arranging the screens such that a viewer located in front of the foremost of the forward screens can see apparent whole images when projected on each of the screens, projecting a first image from a point in front of the foremost of the forward screens on the foremost screen, and simultaneously projecting a plurality of images from a point in front of said foremost screen, flattening the projected beam of each of the last-mentioned images to decrease its cross-sectional height, directing each of said flattened beams in a path which will clear the margin of each screen between said point and the screen upon which the beam is ultimately directed, and expanding each of said flattened beams to its original cross-sectional shape while directing the expanded beam upon one of said screens.

5. A projection method according to claim 4, in which the light intensity of each beam is regulated with respect to the other beams.

6. A method of projecting a three-dimensional display for a viewer comprising providing a rear screen and a plurality of forward screens having reflecting areas with open spaces therebetween of such dimensions as to reflect and transmit apparent whole images to a viewer, arranging the screens such that a viewer located in front of the foremost of the forward screens can see apparent whole images when projected on each of the screens, projecting a first image from a point in front of the foremost of the forward screens on the foremost screen, and simultaneously projecting a plurality of images from a point in front of said foremost screen, flattening the projected beam of each of the last-mentioned images to decrease its cross-sectional height, directing each of said flattened beams in a path which will clear the margin of each screen between said point and the screen upon which the beam is ultimately directed, and expanding each of said flattened beams to its original cross-sectional shape while directing the expanded beam upon one of said screens, and substantially reducing the intensity of the transmitted light coming from each screen before it impinges upon the next adjacent screen surface.

7. Apparatus for projecting a three-dimensional display for a viewer comprising a first screen having reflecting areas with open spaces therebetween with such dimensions as to reflect and transmit apparent whole images to a viewer, a second screen spaced rearwardly of said first screen such that a viewer located in front of the first screen can see apparent whole images when projected on the first screen and the second screen, an image projection device disposed in front of said first screen, a compressing anamorphic optical device disposed between said first projection device and said second screen, an expanding anamorphic optical device spaced from the margin of said first screen and disposed between said compressing optical device and said second screen and being disposed in front of said second screen, said expanding optical device receiving and expanding the light beam from said compressing device and directing the expanded beam upon said second screen.

8. Apparatus as defined in claim 7, wherein the image projection device comprises a plurality of light sources, all but one of which is provided with a compressing anamorphic device and an expanding anamorphic device for each of said compressing devices.

9. Apparatus for projecting a three-dimensional display for a viewer comprising a rear screen and a plurality of forward screens, each of said forward screens having reflecting areas with open spaces therebetween with such dimensions as to reflect and transmit apparent whole images to a viewer, said forward screens being spaced forwardly of said rear screen such that a viewer located in front of the foremost of the forward screens can see apparent whole images when projected on each of the screens, an image projection means disposed in front of the foremost of the forward screens, compressing anamorphic optical means between said image projection means and said foremost screen, an expanding anamorphic optical device for each of the screens other than said foremost screen for receiving and expanding the light from said compressing means and directing the expanded beam upon one of said screens other than the foremost screen, each of said expanding devices being spaced from the margin of the screen immediately forward of the screen upon which the expanding device directs the light beam so as to project the images on each of the screens without impinging upon any of the other screens, and means to regulate the light intensity of the transmitted light coming from each screen before it impinges upon the next adjacent screen surface.

10. Apparatus as defined in claim 9, wherein said compressing anamorphic optical means is a cylindrical convex positive lens having a horizontal axis.

11. Apparatus as defined in claim 9, wherein at least one of said expanding anamorphic optical devices is a cylindrical concave negative lens having a horizontal axis.

12. Apparatus as defined in claim 9, wherein at least one of said expanding anamorphic optical devices is a cylindrical convex mirror having a horizontal axis.

13. Apparatus for projecting a three-dimensional display for a viewer comprising a rear screen and a plurality of forward screens, each of said forward screens having reflecting areas with open spaces therebetween with such dimensions as to reflect and transmit apparent whole images to a viewer, said forward screens being spaced forwardly of said rear screen such that a viewer located in front of the foremost of the forward screens can see apparent whole images when projected on each of the screens, an image projection means disposed in front of the foremost of the forward screens, compressing anamorphic optical means between said image projection means and said foremost screen, an expanding anamorphic optical device for each of the screens other than said foremost screen for receiving and expanding the light from said compressing means and directing the expanded beam upon one of said screens other than the foremost screen, each of said expanding devices being spaced from the margin of the screen immediately forward of the screen upon which the expanding device directs the light beam so as to project the images on each of the screens without impinging upon any of the other screens, and means to regulate the light intensity of the transmitted light coming from each screen before it impinges upon the next adjacent screen surface, and a light filter disposed between each pair of adjacent screens and at an angle to the screens to absorb light coming from each of the screens before it impinges upon the next adjacent screen.

14. Apparatus as defined in claim 13, wherein the light filter is a neutral density filter.

15. Apparatus as defined in claim 13, wherein the light filter is a polarizer.

16. Apparatus as defined in claim 13, wherein the light filter is a multi-layer filter so constructed and arranged as to reflect light coming from an adjacent screen downwardly whereby such reflected light can be absorbed.

17. Apparatus as defined in claim 13, wherein the light filter comprises a multi-layer light polarizing filter adapted to filter light coming from each screen before it impinges upon a screen adjacent thereto.

References Cited in the file of this patent

UNITED STATES PATENTS

| | | |
|---|---|---|
| 1,019,141 | Engelsmann | Mar. 5, 1912 |
| 1,024,734 | Massohn et al. | Apr. 30, 1912 |
| 1,692,973 | Babcock | Nov. 27, 1928 |
| 1,771,844 | Eilenberg et al. | July 29, 1930 |
| 2,084,795 | Donle | June 22, 1937 |
| 2,142,183 | De Ybarrondo | Jan. 3, 1939 |
| 2,157,138 | Mendez | May 9, 1939 |
| 2,244,687 | Goldsmith | June 10, 1941 |
| 2,320,760 | Surre | June 1, 1943 |
| 2,400,111 | Gardner | May 14, 1946 |
| 2,468,046 | De Los Monteros | Apr. 26, 1949 |
| 2,513,149 | Coutant et al. | June 27, 1950 |
| 2,542,789 | Ames | Feb. 20, 1951 |

FOREIGN PATENTS

| | | |
|---|---|---|
| 198,428 | Switzerland | Dec. 16, 1938 |
| 1,111,830 | France | Nov. 2, 1955 |